United States Patent
Hirama

(10) Patent No.: US 9,967,413 B2
(45) Date of Patent: May 8, 2018

(54) INFORMATION PROCESSING APPARATUS AND MAINTENANCE SYSTEM INCLUDING DISPLAY OF GUIDANCE INFORMATION

(71) Applicant: Oki Data Corporation, Tokyo (JP)

(72) Inventor: Masayuki Hirama, Tokyo (JP)

(73) Assignee: Oki Data Corporation, Tokyo (JP)

(*) Notice: Subject to any disclaimer, the term of this patent is extended or adjusted under 35 U.S.C. 154(b) by 0 days. days.

(21) Appl. No.: 15/132,507

(22) Filed: Apr. 19, 2016

(65) Prior Publication Data

US 2016/0352935 A1    Dec. 1, 2016

(30) Foreign Application Priority Data

May 29, 2015 (JP) ................. 2015-110267

(51) Int. Cl.
*H04N 1/00* (2006.01)
*G03G 15/00* (2006.01)
(Continued)

(52) U.S. Cl.
CPC ..... *H04N 1/00344* (2013.01); *G03G 15/5079* (2013.01); *G06F 3/121* (2013.01);
(Continued)

(58) Field of Classification Search
CPC .......... H04N 1/00344; H04N 1/00411; H04N 1/32625; G06F 9/4446; G03G 15/55;
(Continued)

(56) References Cited

U.S. PATENT DOCUMENTS

2006/0164675 A1   7/2006  Yamada et al.
2008/0307319 A1*  12/2008  Iwata ................ G06K 15/007
                                                         715/748
(Continued)

FOREIGN PATENT DOCUMENTS

JP       2007264072 A    10/2007

OTHER PUBLICATIONS

Search Report dated Oct. 5, 2016 in EP Application No. 161665219.

*Primary Examiner* — Jamares Q Washington
(74) *Attorney, Agent, or Firm* — Panitch Schwarze Belisario & Nadel LLP

(57) ABSTRACT

An information processing apparatus includes a display unit that displays an image, a storage unit that preliminarily stores first guidance information (representing operation contents relating to the first state) in association with a first state, a detection unit that detects the first state or a second state, a communication unit that provides communication with an external device, and a controller that controls the display unit, the storage unit and the communication unit. When the detection unit detects the second state, the controller causes the communication unit to transmit apparatus information representing a state of the information processing apparatus to the external device, causes the communication unit to receive second guidance information (representing operation contents relating to the second state) from the external device, and causes the display unit to display an image based on the second guidance information received by the communication unit.

12 Claims, 6 Drawing Sheets

(51) Int. Cl.
*G06F 3/12* (2006.01)
*G06F 11/07* (2006.01)
*H04N 1/32* (2006.01)
*G06F 9/44* (2018.01)

(52) U.S. Cl.
CPC .......... *G06F 3/1234* (2013.01); *G06F 3/1288* (2013.01); *G06F 11/0733* (2013.01); *H04N 1/00411* (2013.01); *H04N 1/32625* (2013.01); *H04N 1/32667* (2013.01); *G06F 9/4446* (2013.01); *H04N 2201/0094* (2013.01)

(58) Field of Classification Search
CPC ................ G03G 15/502; G03G 15/70; G03G 2215/00548; G03G 2221/1675
USPC ............. 358/1.15; 399/9, 11, 12, 21, 24, 81; 715/705, 709, 714
See application file for complete search history.

(56) References Cited

U.S. PATENT DOCUMENTS

| | | | |
|---|---|---|---|
| 2009/0316174 A1 | 12/2009 | Kurahashi | |
| 2013/0021641 A1* | 1/2013 | Park | G06F 3/121 358/1.14 |
| 2013/0114100 A1* | 5/2013 | Torii | G06F 11/0733 358/1.14 |
| 2014/0082544 A1* | 3/2014 | Umeizumi | H04N 1/00411 715/772 |
| 2015/0172477 A1* | 6/2015 | Yamamoto | H04N 1/32657 358/1.15 |

* cited by examiner

INFORMATION PROCESSING APPARATUS AND MAINTENANCE SYSTEM INCLUDING DISPLAY OF GUIDANCE INFORMATION

BACKGROUND OF THE INVENTION

The present invention relates to an information processing apparatus such as a printer, and a maintenance system for maintenance of the information processing apparatus.

Recently, printers have become widespread, which include a sensor or the like for detecting a failure such as a toner shortage or a sheet jam and which are configured to notify a user of the failure using a display screen or the like.

The failure of the printer is solved by an operation of a user, a service person or the like. In many cases, the user is not familiar with operation contents to solve the failure, and therefore the user has to refer to a user's manual or the like. However, it is troublesome to perform the operation referring to the user's manual or the like.

For this reason, Japanese Application Publication No. 2007-264072 proposes a printer that previously stores a plurality of sets of guidance information corresponding to possible failures. The guidance information includes sentences or images representing operation contents to be performed by a user to solve the failure. The printer displays the guidance information corresponding to a detected failure on a display screen so that the user can easily perform an operation to solve the failure.

However, there are a lot of failures that are assumed to occur in an information processing apparatus such as a printer. Therefore, even when the failure is such that the user can solve it, there may be cases where the printer stores no guidance information corresponding to the failure.

In such cases, the user of the information processing apparatus may, for example, make contact with a maintenance center in charge of the information processing apparatus, and learn how to operate from an operator familiar with maintenance of the information processing apparatus. Alternatively, a service person may be dispatched from the maintenance center to a place where the information processing apparatus is installed, and may perform the operation to solve the failure. As a result, a burden on the user, the operator or the service person may increase.

SUMMARY OF THE INVENTION

An aspect of the present invention is intended to provide an information processing apparatus and a maintenance system capable of reducing a burden required for solving a failure.

According to an aspect of the present invention, there is provided an information processing apparatus including a display unit that displays an image, and a storage unit that preliminarily stores first guidance information in association with a first state. The first guidance information represents operation contents relating to the first state. The information processing apparatus further includes a detection unit that detects the first state or a second state, a communication unit that provides communication with an external device, and a controller that controls the display unit, the storage unit and the communication unit. When the detection unit detects the second state, the controller causes the communication unit to transmit apparatus information representing a state of the information processing apparatus to the external device, causes the communication unit to receive second guidance information from the external device, and causes the display unit to display an image based on the second guidance information received by the communication unit. The second guidance information represents operation contents relating to the second state.

With such a configuration, it becomes possible to provide an information processing apparatus and a maintenance system capable of reducing a burden required for solving a failure.

DETAILED DESCRIPTION OF THE PREFERRED EMBODIMENT

First Embodiment

Hereinafter, the embodiment of the present invention will be described with reference to the drawings.

<Configuration of Maintenance System>

Figure 1:
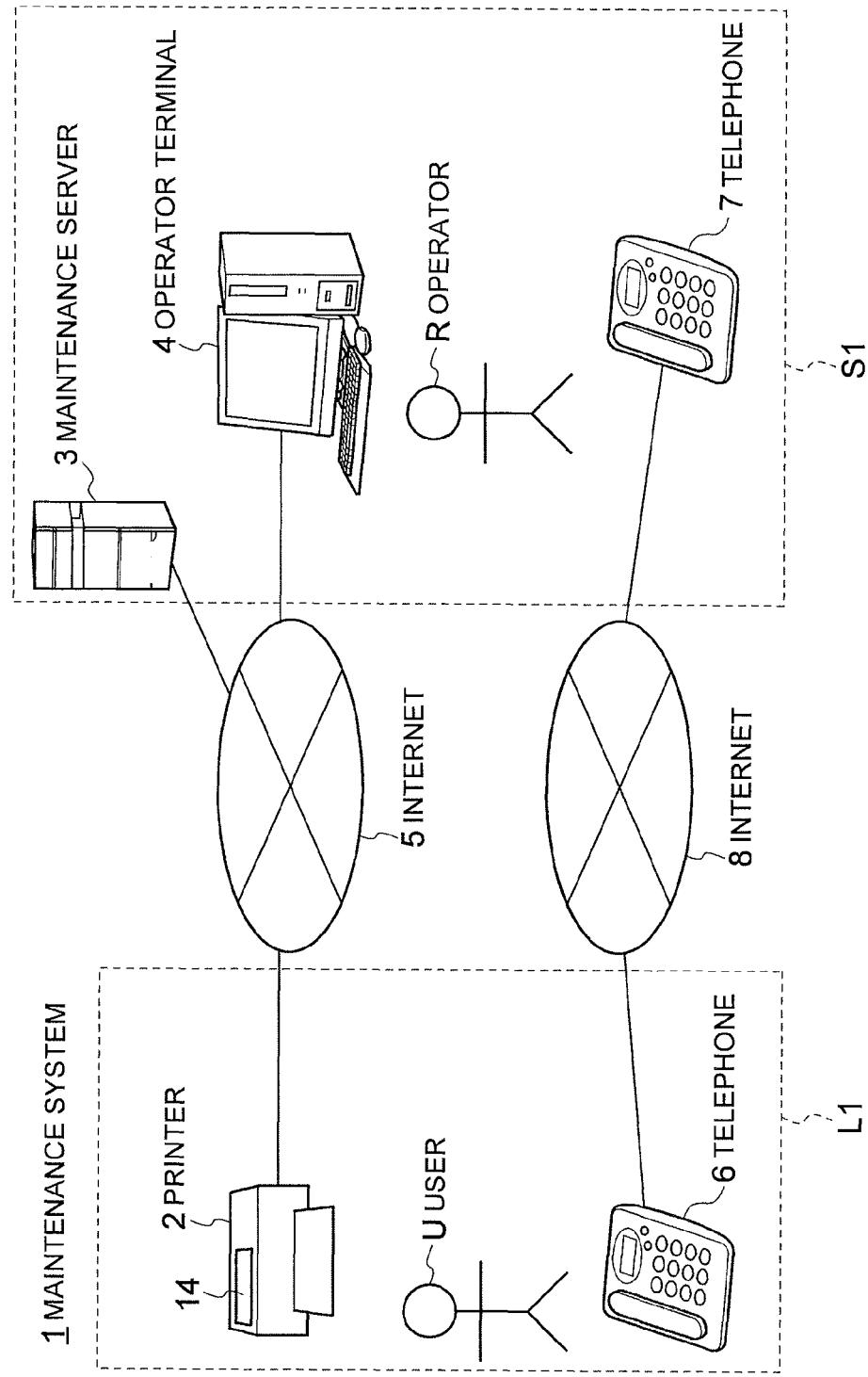
FIG. 1 is a schematic view showing an entire configuration of a maintenance system according to the embodiment.

FIG. 1 is a schematic view showing an entire configuration of a maintenance system 1 according to the embodiment. The maintenance system 1 according to the embodiment includes a printer 2, a maintenance server 3 and an operator terminal 4 which are connected with each other via an internet 5. The maintenance system 1 is configured to provide maintenance service for the printer 2.

The printer 2 is installed in an installation location L1 in an office, home or the like of a user U. The maintenance server 3 and the operator terminal 4 are provided in a maintenance center S1 distanced from the installation location L1. In the maintenance center S1, an operator R is on standby. The operator R has sufficient knowledge on a configuration and maintenance of the printer 2 and is capable of operating the operator terminal 4.

Telephones 6 and 7 are respectively provided in the installation location L1 and the maintenance center S1. The telephones 6 and 7 are connectable with each other via a telephone line 8. Therefore, the user U in the installation location L1 and the operator R in the maintenance center S1 can make a conversation with each other using the telephones 6 and 7 via the telephone line 8.

The printer 2 is in the form of, for example, an MFT (Multi-Function Peripheral). That is, the printer 2 has a printing function to form (i.e., print) an image on a sheet (i.e., a medium), an image scanning function to read an image, and a communication function. By combining these functions, the printer 2 can function as a printer, a copier, a facsimile machine or the like.

Figure 2:
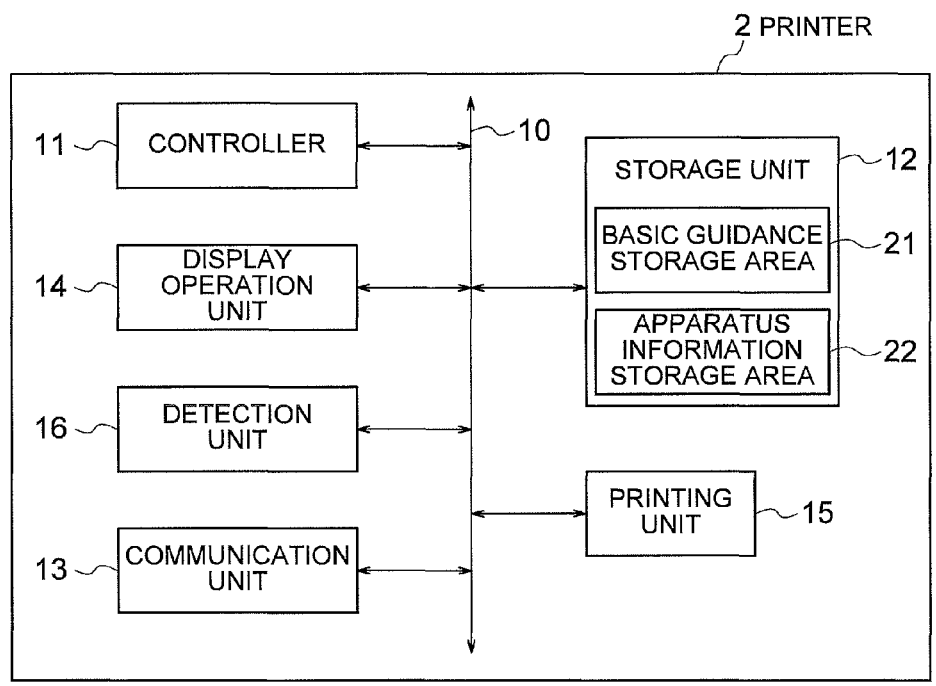
FIG. 2 is a schematic view showing a configuration of a printer according to the embodiment.

As shown in FIG. 2, the printer 2 includes a controller 11, a storage unit 12, a communication unit 13, a display operation unit 14, a printing unit 15 and a detection unit 16 which are connected with each other via a bus 10. The controller 11 controls an entire operation of the printer 2.

The controller 11 as a first controller includes a CPU (Central Processing Unit) as a main component. The controller 11 performs various processing such as printing or displaying guidance (described later) by reading a predetermined program from a not shown ROM (Read Only Memory), a flash memory or the like and performing the read program.

The storage unit 12 as a first storage unit includes a RAM (Random Access Memory), a hard disk drive or the like, and stores various information such as various set contents or the like required for processing such as printing or guidance displaying.

The communication unit 13 as a first communication unit is connected to the internet 5 via a wired LAN (Local Area Network) according to a standard such as IEEE (Institute of Electrical and Electronics Engineers) 802.3u/ab or the like, or a wireless LAN according to a standard such as IEEE 802.11a/b/g/n/ac or the like. The communication unit 13 supplies various information and data received from the internet 5 to the controller 11, and transmits various information supplied by the controller 11 to the internet 5, while performing predetermined modulation, demodulation or the like. Further, the communication unit 13 is connected to a not shown computer. The communication unit 13 receives image data or printing command from the computer, and supplies the received image data or printing command to the controller 11.

The display operation unit 14 as a display unit includes a combination of a not shown touch panel and hardware keys. The touch panel includes an LCD (Liquid Crystal Display) and a touch sensor coupled with each other. The LCD displays a screen showing various information or used for operation input. A touch sensor is touched by a user to input operation instructions or the like. The hardware keys include a mode shift key, numeric keys, arrow keys (cursor keys), an enter key or the like. The mode shift key is used to switch an operation mode of the printer 2 (i.e., copying, facsimile transmission, printing or the like).

The printing unit 15 includes a not shown exposure device, a fixing device, a conveying mechanism for conveying a sheet, and the like. The printing unit 15 performs printing by conveying the sheet, forming a toner image (i.e., a developer image) based on the image data supplied by the controller 11, and transferring and fixing the toner image to the sheet. The detection unit 16 includes various sensors such as an optical switch, various switches or the like. The detection unit 16 detects states of respective parts of the printer 2 such as presence/absence of the sheet on a sheet conveying path in the printer 2 and a remaining amount of a toner in the printing unit 15, and notifies the controller 11 of a detection result.

The storage unit 12 includes a basic guidance storage area 21 and an apparatus information storage area 22. In the printer 2, a failure (referred to as a basic failure or a first state) such as a toner shortage or a sheet jam that can be solved by an operation of the user U (FIG. 1) may relatively frequently occur.

Therefore, the basic guidance storage area 21 stores a plurality of sets of basic guidance (referred to as first guidance information) each of which represents an operation to be performed by the user U to solve the basic failure using a sentence, a drawing or the like. Each set of the basic guidance includes one or a plurality of basic guide screens (referred to as a first guide image). An order of displaying the basic guide screens is preliminarily set.

Figure 3:
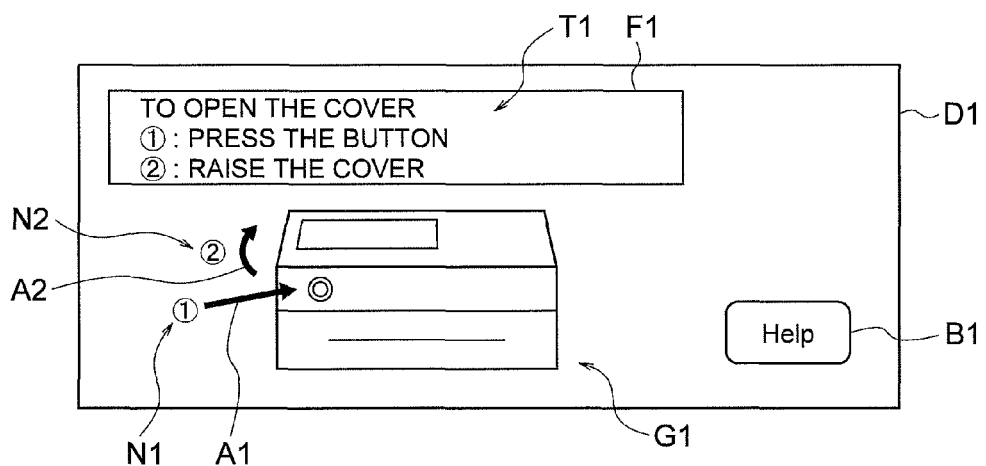
FIG. 3 is a schematic view showing a configuration of a basic guide screen according to the embodiment.

The basis guide screen includes a sentence (i.e., a character), a drawing (i.e., a graphic) or a combination thereof. For example, the basic guide screen D1 includes a drawing G1 indicating the printer 2, an arrow A1 indicating a target portion, an arrow A2 indicating a direction of motion, a sentence T1 surrounded by a character frame F1, numerals enclosed within circles N1 and N2 indicating correspondence of the sentence and the drawing, and a button B1. The basic guide screen D1 shown in FIG. 3 represents an operation procedure to open a cover provided above a main body of the printer 2 and to access inside the printer 2 using the sentences and the drawings.

When the controller 11 determines that the basic failure occurs in the printer 2 based on the detection result of the detection unit 16, the controller 11 reads out the basic guidance corresponding to the detected basic failure from the basic guidance storage area 21 of the storage unit 12, and causes the display operation unit 14 to sequentially display the basic guide screens included in the basic guidance. The user U performs an operation according to the basic guidance, and solve the basic failure.

Further, the apparatus information storage area 22 stores apparatus information, i.e., various information regarding the printer 2. The apparatus information includes apparatus identification information, apparatus configuration information, apparatus setting information, and apparatus state information. The apparatus identification information is used to identify the individual apparatus (i.e., the printer 2), and includes, for example, an identification number or the like assigned to the printer 2. The apparatus configuration information indicates a state in which a detachable part (i.e., an option part) is mounted. The apparatus setting information represents settings set by the user U such as a printing density, a time interval before transition to a standby mode, or the like.

The apparatus state information includes apparatus use history information and consumable part residual amount information. The apparatus use history information indicates a use history of the apparatus (i.e., the printer 2), and includes, for example, an operating time, a total number of printed sheets, a number of printed sheets after the latest replacement of a consumable part that needs to be replaced at a certain time period, or the like. The consumable part residual amount information includes, for example, a lifetime of a replacement part such as a photosensitive drum or a conveying belt, a remaining amount of consumables such as a toner that needs to be replenished, or the like.

Figure 4:
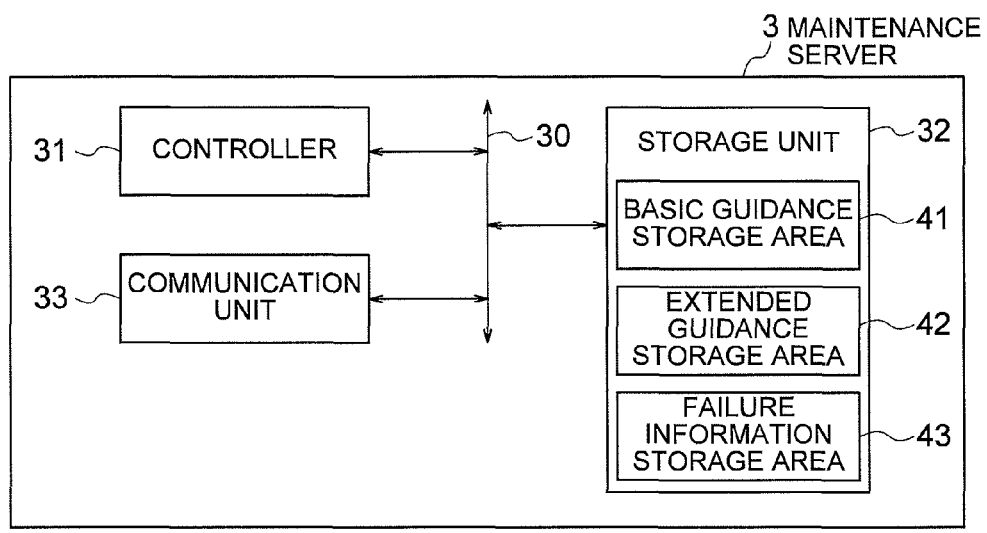
FIG. 4 is a schematic view showing a configuration of a maintenance server according to the embodiment.

The maintenance server 3 (FIG. 1) is connected to the internet 5, and is also referred to as a cloud server. Hereinafter, the maintenance server 3 and the operator terminal (described later) are referred to as external devices. As shown in FIG. 4, the maintenance server 3 includes a controller 31, a storage unit (or a storage device) 32 and a communication unit 33 which are connected with each other via a bus 30.

The controller 31 as a second controller controls an entire operation of the maintenance server 3. The controller 31 includes a CPU (not shown) as a main component, as is the case with the controller 11. The controller 31 performs various processing such as failure handling or communication by reading a predetermined program from a not shown ROM, a flash memory or the like and performing the read program.

The storage unit 32 as a second storage unit includes a RAM, a hard disk drive or the like, as is the case with the storage unit 12. The storage unit 32 stores various information, and includes a basic guidance storage area 41, an extended guidance storage area 42 and a failure information storage area 43. The basic guidance storage area 41 stores a plurality of sets of basic guidance stored in the printer 2 and other various apparatuses and basic guide screens constituting each set of the basic guidance.

Extended guidance is registered (stored) in the extended guidance storage area 42. The extended guidance (referred to as second guidance information) represents a procedure and details of an operation to be performed by the user U using a sentence, a drawing or a combination thereof, as is the case with the basic guidance. In this regard, the extended guidance represents an operation to solve a failure (referred to as an extended failure or a second state) other than the above described basic failure, and includes extended guide screens (referred to as second guide images) different from basic guide screens. The failure information storage area 43 is an area for storing failure information as described later.

The communication unit 33 as a second communication unit (i.e., a second communication unit) is connected to the internet 5 via a wired LAN according to the standard such as IEEE 802.3u/ab or the like, or a wireless LAN according to the standard such as IEEE 802.11a/b/g/n/ac or the like, as is the case with the communication unit 13. The communication unit 33 supplies various information and data received from the internet 5 to the controller 31, and transmits various information supplied by the controller 31 to the internet 5, while performing predetermined modulation, demodulation or the like.

Figure 5:
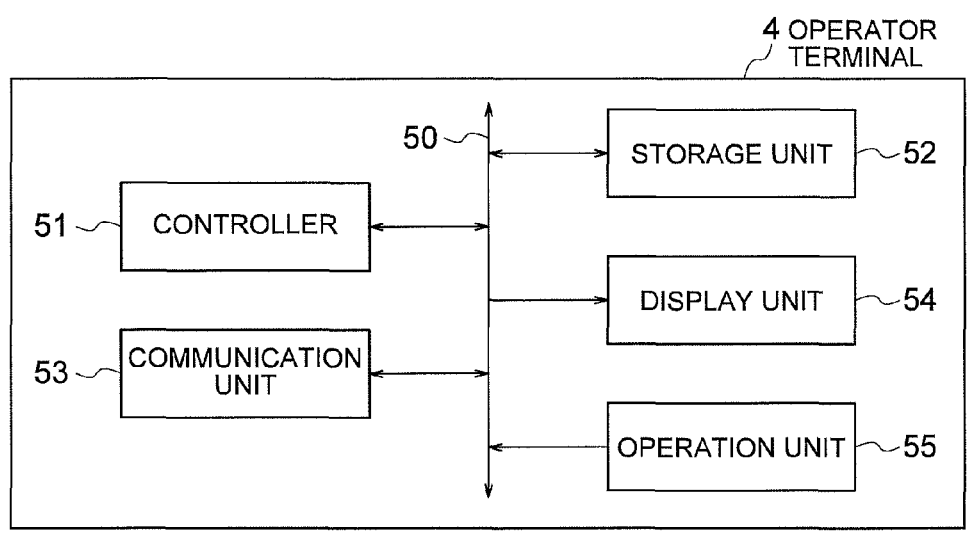
FIG. 5 is a schematic view showing a configuration of an operator terminal according to the embodiment.

The operator terminal 4 (FIG. 1) is a computer connected to the internet 5, and is operated by an operator R. As shown in FIG. 5, the operator terminal 4 includes a controller 51, a storage unit (or a storage device) 52, a communication unit 53, a display unit 54 and an operation unit 55 which are connected with each other via a bus 50.

The controller 51 as a second controller performs various processing such as maintenance handling or creation of the extended guidance by reading a predetermined program from a not shown ROM, a flash memory or the like and performing the read program, as is the case with the controllers 11 and 31. The storage unit 52 as a second storage unit includes a RAM, a hard disk drive or the like, and stores various information, as is the case with the storage units 12 and 32.

The communication unit 53 as a second communication unit is connected to the internet 5 via a wired LAN according to the standard such as IEEE 802.3u/ab or the like, or a wireless LAN according to the standard such as IEEE 802.11a/b/g/n/ac or the like, as is the case with the communication units 13 and 33. The display unit 54 includes, for example, an LCD display, and displays various display screens for the operator R. The operation unit 55 includes, for example, a keyboard or mouse, and receives operation input of the operator R.

<Maintenance Sequence>

Figure 6:
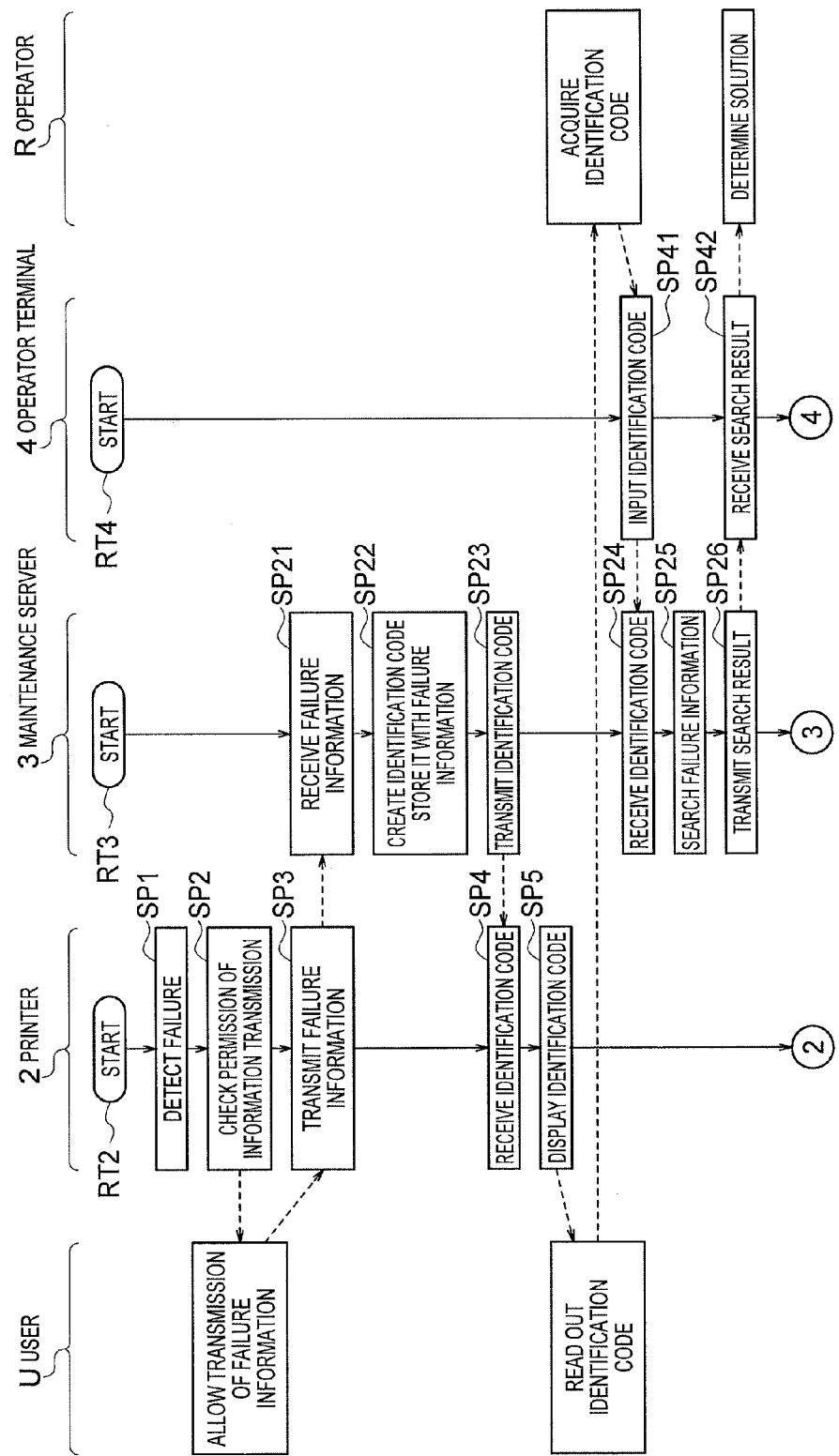
FIG. 6 is a schematic view showing a maintenance sequence according to the embodiment.
Figure 7:
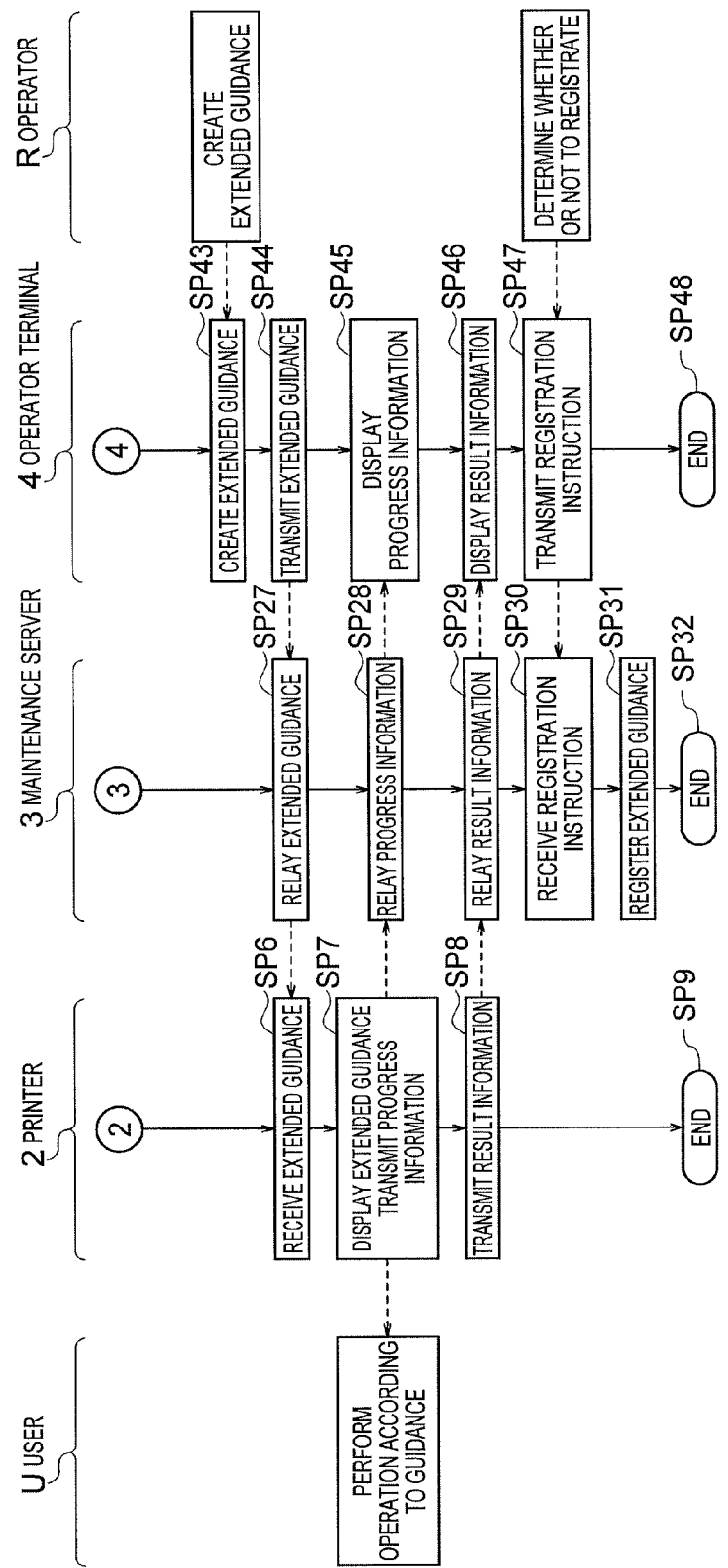
FIG. 7 is a schematic view showing the maintenance sequence according to the embodiment.

The maintenance system 1 is configured to perform a maintenance sequence as shown in FIGS. 6 and 7, when a failure occurs in the printer 2. FIGS. 6 and 7 show processing performed by the printer 2, the maintenance server 3 and the operator terminal 4 of the maintenance system 1 and correspondence therebetween. For convenience in explanation, FIGS. 6 and 7 also show correspondence with operations performed by the user U and the operator R.

When the printer 2 is turned ON, the controller 11 of the printer 2 starts a printer failure handling procedure RT2. In step SP1 of the printer failure handling procedure RT2, the controller 11 waits for the detection unit 16 to detect the failure. When the detection unit 16 detects the failure, the controller 11 proceeds to step SP2.

In this regard, when the detected failure is the basic failure, the controller 11 reads out basic guide screens of the basic guidance from the basic guidance storage area 21 of the storage unit 12, and sequentially displays the basic guide screens on the display operation unit 14 as described above, so that the user U can perform the operation to solve the basic failure. In this case, the controller 11 does not perform processing of step SP2 and later.

In step SP2, the controller 11 causes the display operation unit 14 to display a predetermined failure notice screen. The failure notice screen includes a sentence, a drawing or a combination thereof representing that the failure occurs in the printer 2 and representing contents of a failure. The failure notice screen further includes a message asking the user U whether the user U permits transmission of information on the failure (referred to as failure information) and information on the printer 2 (i.e., apparatus information stored in the apparatus information storage area 22) to the maintenance server 3. The failure notice screen further includes a button or the like with which the user U inputs an instruction. When the controller 11 receives an instruction of the user U permitting the transmission of the failure information and the apparatus information, the controller 11 proceeds to step SP3.

In step SP3, the controller 11 transmits the failure information and the apparatus information to the maintenance server 3 through the internet 5 (FIG. 1) via the communication unit 13, and proceeds to step SP4. In contrast, when the controller 11 receives an instruction of the user U prohibiting the transmission of the failure information and the apparatus information in step SP2, the controller 11 does not preform processing of step SP3 and later.

When the maintenance server 3 is turned ON, the controller 31 of the maintenance server 3 starts a maintenance server failure handling procedure RT3. In step SP21 of the maintenance server failure handling procedure RT3, the controller 31 waits for the failure information and the apparatus information transmitted from the printer 2 through the internet 5 via the communication unit 33. When the controller 31 receives the failure information and the apparatus information, the controller 31 proceeds to step SP22.

In step SP22, the controller 31 creates new identification code, and stores the created identification code in association with the received failure information and apparatus information in the failure information storage area 43 of the storage unit 32. Then, the controller 31 proceeds to step SP23, and transmits the identification code created in step SP22 to the printer 2 via the communication unit 33. Then, the controller 31 proceeds to step SP24. In this regard, the controller 31 specifies respective failures by creating new identification code every time the controller 31 receives the failure information. In step SP3, the controller 31 transmits the identification code created in step SP22 to the printer 2, and proceeds to step SP24.

The controller 11 of the printer 2 receives the identification code from the maintenance server 3 via the communication unit 13 in step SP4, and proceeds to step SP5. In step SP5, the controller 11 causes the display operation unit 14 to display a predetermined identification code display screen, and proceeds to step SP6 (FIG. 7). The identification code display screen includes the identification code received in step SP4 and a telephone number of the maintenance center S1.

The user U recognizes the telephone number displayed on the display operation unit 14, operates the telephone 6 (FIG. 1) to connect to the telephone 7 through the telephone line 8, and makes a conversation with the operator R in the maintenance center S1. The user U reads aloud the identification code displayed on the display operation unit 14 to notify the operator R of the identification code.

When the operator terminal 4 is turned ON, the controller of the operator terminal 4 starts an operator terminal failure handling procedure RT4. In a step SP41 of the operator terminal failure handling procedure RT4, the controller 51 receives the identification code inputted by the operator R who acquires the identification code from the user U. The controller 51 transmits the identification code to the maintenance server 3 via the communication unit 53, and proceeds to step SP42.

The controller 31 of the maintenance server 3 receives the identification code from the operator terminal 4 via the communication unit 33 in step SP24, and proceeds to step SP25. In step SP25, the controller 31 searches the failure information stored in the failure information storage area 43 of the storage unit 32 using the received identification code as a search key, and proceeds to step SP26.

In step SP26, the controller 31 transmits a search result of step SP25 to the operator terminal 4 via the communication unit 33, and proceeds to step SP27 (FIG. 7). More specifically, the controller 31 reads out the failure information and the apparatus information associated with the identification code from the failure information storage area 43, and also reads out the corresponding basic guidance and extended guidance respectively from the basic guidance storage area 41 and the extended guidance storage area 42. The controller 31 transmits the failure information, the apparatus information, the basic guidance and the extended guidance to the operator terminal 4 as a search result.

The controller 51 of the operator terminal 4 receives the search result (i.e., the failure information, the apparatus information, the basic guidance and the extended guidance) from the maintenance server 3 via the communication unit 53. The controller 51 causes the display unit 54 to display the failure information and the apparatus information, and proceeds to step SP43 (FIG. 7). The operator R determines a solution to the failure by comprehensively considering the failure information and the apparatus information displayed on the display unit 54, a situation of the failure acquired from the user U via the telephone (FIG. 1), or the like.

The operator R also refers to contents of the extended guidance received from the maintenance server 3. When the operator R determines that the failure cannot be solved by the existing extended guidance stored in the extended guidance storage area 42 of the maintenance server 3, the operator R creates new extended guidance. This means that the failure occurring in the printer 2 is an extended failure, and no extended guidance corresponding thereto is registered in the maintenance server 3. Such a failure will be referred to as an unregistered failure or an unregistered state.

The operator terminal 4 creates new extended guidance (referred to as unregistered guidance information) according to an operation of the operator R in step SP43 (FIG. 7), and proceeds to step SP44. In this case, the new extended guidance is obtained by appropriately combining a plurality of the basic guide screens, the extended guide screen and new extended guide screen. The new extended guide screen (referred to as an unregistered guide image) is created by the operator terminal 4 utilizing the basic guide screen received in step SP42 according to an operation of the operator R.

Figure 8A:
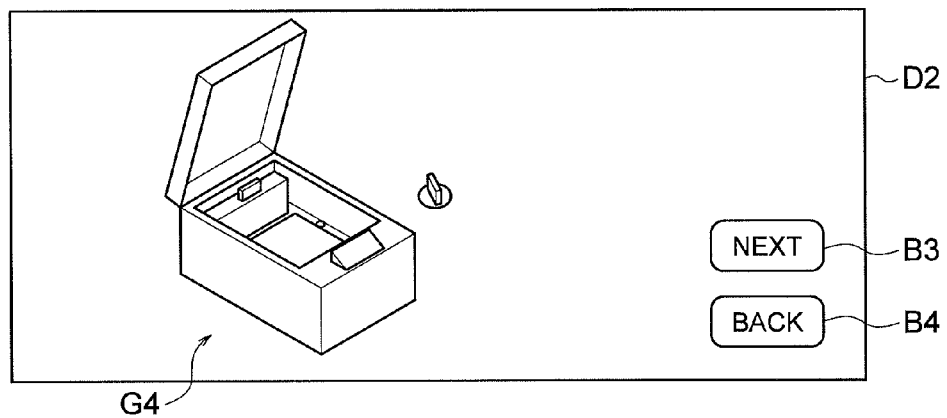
FIGS. 8A, 8B and 8C are schematic views for illustrating a method for a creating new extended guide screen according to the embodiment.
Figure 8B:
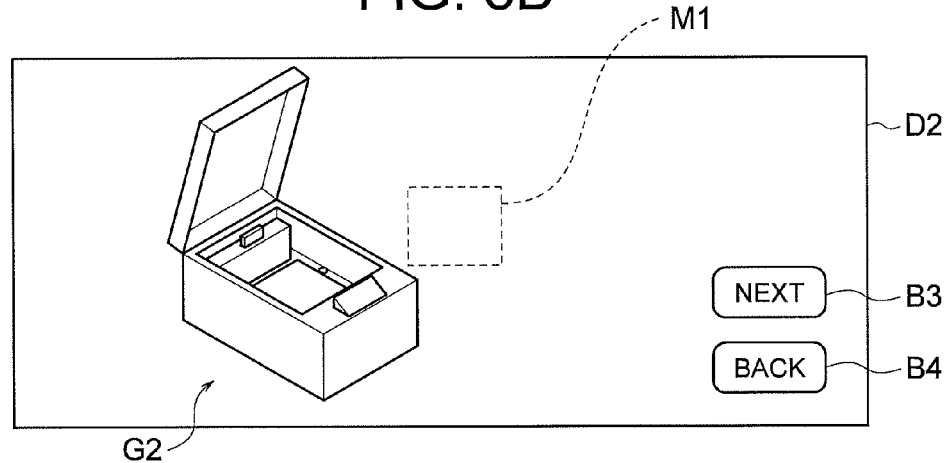

For example, in FIG. 8A, a drawing G2 and buttons B3 and B4 are displayed on the basic guide screen D2. In the case where a part of the drawing G2 is to be masked (covered), the operator terminal 4 sets a mask area M1 having the same color as a background and having a rectangular shape according to the operation of the operator R as shown in FIG. 8B. Although the mask area M1 is surrounded by a broken line in FIG. 8B for convenience of explanation, a border between the mask area M1 and the background is not actually displayed.

Figure 8C:
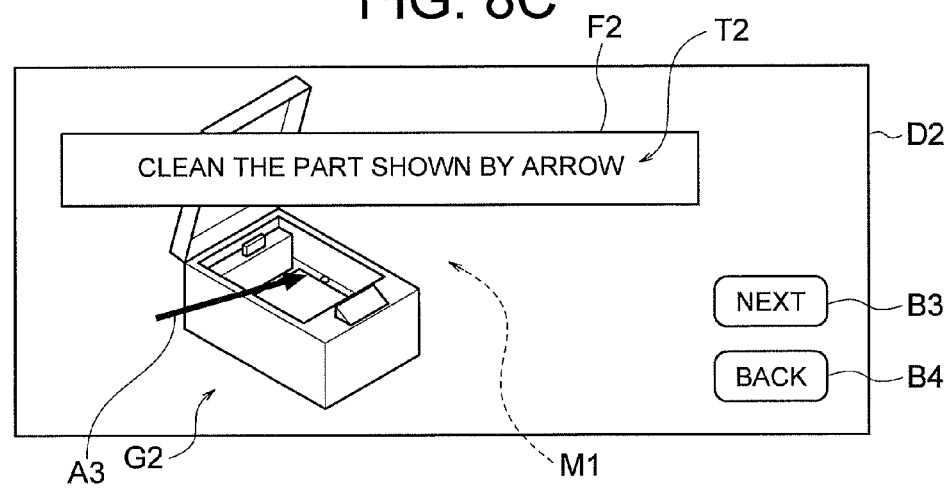

In the case where another drawing, sentence or the like is to be added, the operator terminal 4 adds an arrow A3 and a character frame F2 in an overlapping manner on a part of the drawing G2, and adds a sentence T2 in the character frame F2 as shown in FIG. 8C, according to the operation of the operator R. The guide screen created in this way is referred to as an extended guide screen D3.

In this regard, information representing the extended guide screen D3 includes information indicating that the extended guide screen D3 uses the basic guide screen D2, and information on changes from the basic guide screen D2. The information on changes includes, a position and a size of the mask area M1, a line type and positions of a starting point and an end point of the arrow A3, and a position and a size of the character frame F2, contents of the sentence T2, or the like.

In step SP44 (FIG. 7), the controller 51 transmits the created new extended guidance (referred to as unregistered extended guidance) to the maintenance server 3 via the communication unit 53. The controller 31 of the maintenance server 3 receives the extended guidance via the communication unit 33 in step SP27. The controller 31 transmits (i.e., relays) the extended guidance to the printer 2, and proceeds to step SP28.

The controller 11 of the printer 2 receives the extended guidance from the maintenance server 3 via the communication unit 13 in step SP6, and proceeds to step SP7. In step SP7, the controller 11 causes the display operation unit 14 to display the received extended guidance. The user U performs an operation according to guide screens sequentially displayed on the display operation unit 14.

In the case where the extended guide screen is formed by using the basic guide screen as is the case with the extended guide screen D3 shown in FIG. 8C, the controller 11 reads out the basic guide screen from the basic guidance storage area 21, and creates the extended guide screen based on the information indicating the changes from the basic guide screen. Then, the controller 11 causes the display operation unit 14 to display the created extended guide screen.

Further, the controller 11 transmits progress information indicating a state of progress to the maintenance server 3 via the communication unit 13 every time the controller 11 updates the guide screen displayed on the display operation unit 14. The controller 31 of the maintenance server 3 receives the progress information via the communication unit 33, and transmits (i.e., relays) the progress information to the operator terminal 4 in step SP28.

The operator terminal 4 receives the progress information via the communication unit 53. Based on the progress information, the operator terminal 4 displays the state of progress of the extended guidance in the printer 2 on the display unit 54 in step SP45. In other words, the operator terminal 4 indicates which of the guide screens is being displayed on the display operation unit 14. The operator R refers to the progress information, and grasps how much the operation of the user U has progressed.

When the controller 11 of the printer 2 finishes displaying the last guide screen of the extended guidance, the controller 11 proceeds to step SP8. In step SP8, the controller 11 causes the detection unit 16 to detect the latest states of respective parts of the printer 2, and transmits the detected states (referred to as result information) to the maintenance server 3 via the communication unit 13. Then, the controller 11 proceeds to step SP9, and ends the printer failure handling procedure RT2.

The controller 31 of the maintenance server 3 proceeds to step SP29, and receives the result information via the communication unit 33. The controller 31 transmits (i.e., relays) the result information to the operator terminal 4, and proceeds to step SP30. The controller 51 of the operator terminal 4 proceeds to step SP46, and receives the result information via the communication unit 53. The controller 51 causes the display unit 54 to display contents of the result information, and proceeds to step SP47. The operator R refers to the result information, and recognizes whether the failure in the printer 2 is solved or not.

In step SP47, the controller 51 asks the operator R whether the extended guidance (created in step SP43) is to be registered in the maintenance server 3 by displaying a predetermined confirmation screen on the display unit 54. In the case where the controller 51 receives an instruction to register the extended guidance (i.e., a registration instruction), the controller 51 transmits the registration instruction to the maintenance server 3. Then, the controller 51 proceed to step SP48, and ends the operator terminal failure handling procedure RT4. In the case where the controller 51 receives an instruction not to register the extended guidance, the controller 51 transmits no instruction to the maintenance server 3.

The controller 31 of the maintenance server 3 proceeds to step SP30, and receives the registration instruction from operator terminal 4 via the communication unit 33. The controller 31 proceeds to step SP31, and registers the unregistered extended guidance received in step S27 (i.e., new extended guidance created by the operator R in step SP43) in the extended guidance storage area 42. Then, the controller 31 proceeds to step SP32, and ends the maintenance server failure handling procedure RT3.

Further, in the case where the operator R determines that the failure can be solved by the extended guidance received from the maintenance server 3 in step SP42, the operator R causes the operator terminal 4 to omit the processing of steps SP43 and SP44. In this case, the controller 51 of the operator terminal 4 transmits a transmission instruction (i.e., an instruction to transmit the extended guidance to the printer 2) to the maintenance server 3 via the communication unit 53.

The controller 31 of the maintenance server 3 receives the transmission instruction via the communication unit 33 in step SP27, reads out the extended guidance corresponding to the received transmission instruction from the extended guidance storage area 42 of the storage unit 32, and transmits the read extended guidance to the printer 2. In this way, the controller 11 of the printer 2 causes the display operation unit 14 to display the existing extended guidance in step SP7 as in the case where the controller 11 receives the new extended guidance.

<Adantages>

In the above described maintenance system 1, when the extended failure occurs in the printer 2, and when the failure information is transmitted to the maintenance server 3, the extended guidance suitable for solving the failure is selected and transmitted to the printer 2 by a determination of the operator R. The printer 2 causes the display operation unit 14 to display the extended guidance suitable for solving the failure based on the determination of the operator R.

The user U can refer to the sentence or drawing of the guide screen displayed on the display operation unit 14 of the printer 2, and can easily understand the operation contents to perform. More specifically, the user U can perform the operation while understanding the operation contents well. That is, the user U can perform the operation quite easily and accurately, as compared with when the user performs the operation while hearing the explanation of the operator R through the telephone. Further, the operator R can use the sentence or drawing in explaining the operation contents to the user U. Therefore, the operator R can easily explain the operation contents, as compared with when the operator R receives an oral explanation only.

In this way, in the maintenance system 1, when the user U cannot solve the failure by the basic guidance only, the user U can perform the operation according to the extended guidance selected by the operator R. Therefore, a possibility of solving the failure remarkably increases.

Further, in the maintenance system 1, when the operator R determines that the failure cannot be solved by the extended guidance registered in the maintenance server 3, the operator R creates new extended guidance corresponding to the failure, and the new extended guidance is transmitted to the printer 2. Therefore, in the maintenance system 1, even when an unexpected failure occurs in the printer 2, the user U can perform the operation referring to the guide screen according to the new extended guidance.

Further, in the maintenance system 1, when the operator creates the extended guide screen of the new extended guidance, the operator R can use the existing basic guide screen having already been stored in the printer 2. More specifically, a part of the basic guide screen can be masked, or new drawing (such as an arrow or the like), new sentence or the like can be added to the basic guide screen (see, FIGS. 8A, 8B and 8C).

For this reason, in the maintenance system 1, the operator R can easily create the guide screen (to facilitate understanding of the operation contents) with minimal amount of effort, as compared with when the operator R creates new extended guide screen from the beginning. Of the created new guide screens, it is not necessary to transmit the basic guide screen to the printer 2, and it is only necessary to transmit information indicating changes from the basic guide screen to the printer 2. Therefore, a load of communication processing can be reduced.

Further, in the maintenance system 1, the created new extended guidance can be stored in the maintenance server 3 in association with the failure information by the determination of the operator R. Therefore, when the similar failure occurs in future, the extended guidance can be used according to coincidence of the failure information or the like. Therefore, a burden on the operator R can be reduced.

Further, in the maintenance system 1, when the respective extended guide screens are displayed on the display operation unit 14 of the printer 2, the progress information is transmitted to the operator terminal 4 and is displayed on the display unit 54. Therefore, the operator R can recognize the progress information, and can add oral explanation regarding the extended guidance for the user U based on the progress information.

According to the above described maintenance system 1, when the user U cannot solve the failure by the operation according to the basic guidance preliminarily stored in the printer 2, the new extended guidance suitable for solving the failure is created as necessary by the determination of the operator R and is transmitted from the maintenance server 3 to the printer 2. The printer 2 displays the extended guidance suitable for solving the failure on the display operation unit 14, and allows the user U to perform the operation while referring to the extended guidance. Since the user U can perform the operation while understanding the operation contents well, the possibility of solving the failure by the operation of the user U remarkably increases.

<Modifications>

In the above described embodiment, the created new guidance is registered in the maintenance server 3 (i.e., stored in the extended guidance storage area 42 shown in FIG. 4) only when the operator terminal 4 receives instruction from the operator R in step SP47 (FIG. 7). However, the present invention is not limited to such an example. For example, the created new guidance may be registered in the maintenance server 3 unconditionally (i.e., even when the operator terminal 4 receives no instruction from the operator R).

Further, in the above described embodiment, when the operator terminal 4 creates the new extended guidance according to the instruction of the operator R, the operator terminal 4 creates the extended guide screen using the basic guide screen included in the existing basic guidance (see FIGS. 8A, 8B and 8C). However, the present invention is not limited to such an example. For example, the extended guide screen may be created using the extended guide screen of the existing extended guidance, or may be created from the beginning.

Further, in the above described embodiment, the extended guidance transmitted from the maintenance server 3 to the printer 2 is selected by the determination of the operator R based on the failure information or the like transmitted from the printer 2. However, the present invention is not limited to such an example. For example, when the maintenance server 3 receives the failure information or the like from the printer 2, the maintenance server 3 may select the extended guidance corresponding to the failure information or the like and transmit the selected extended guidance to the printer 2 by itself. In this case, the maintenance server 3 may transmit the failure information or the like to the operator terminal 4 only after the user U cannot solve the failure by the operation according to the extended guidance. In these cases, workload of the operator R can be reduced or eliminated, and therefore a burden on the operator R can be reduced.

Further, in the above described embodiment, the printer 2 directly exchanges information with the maintenance server 3, and the maintenance server 3 relays information between the printer 2 and the operator terminal 4 (FIGS. 6 and 7). However, the present invention is not limited to such an example. For example, the printer 2 may directly exchange information with both of the maintenance server 3 and the operator terminal 4. In this case, although it becomes necessary for the printer 2 to specify a destination or source of the information, the relay processing of the maintenance server 3 can be omitted.

In the above described embodiment further, the failure information and the apparatus information are transmitted to the maintenance server 3 only when the user U permits the transmission in step SP3 (FIG. 6). However, the present invention is not limited to such an example. For example, as long as permission to transmit the failure information or the like is preliminarily set, the failure information may be transmitted to the maintenance server 3 upon occurrence of the failure without obtaining permission of the user U again.

In the above described embodiment, the progress information is transmitted to the operator terminal 4 via the maintenance server 3 without obtaining permission of the user U in step SP7 (FIG. 7). However, the present invention is not limited to such an example. For example, it is also possible to check the permission of the user U every time when the progress information is transmitted or only when the progress information is transmitted for the first time, as is the case where the failure information or the like is transmitted to the maintenance server 3 in step SP3. Further, it is also possible to allow the user U to preliminarily set permission to transmit the progress information in a similar manner as described above. The same can be said to the result information transmitted in step SP8.

In the above described embodiment, the progress information and the result information are transmitted to the operator terminal 4 via the maintenance server 3 respectively in steps SP7 and SP8 in FIG. 7. However, the present invention is not limited to such an example. For example, it is also possible that the progress information or the result information is not transmitted to the operator terminal 4 when, for example, the user U reports progress or result to the operator R via a conversation via the telephones 6 and 7.

In the above described embodiment, the user U of the printer 2 informs the operator R of the identification code via the telephone 6 or the like. Then, the operator R inputs the identification code into the operator terminal 4, and the operator terminal 4 receives the failure information or the like from the maintenance server 3, and displays the received information or the like on the display unit 54 so that the user U can see the displayed information. For this reason, the maintenance server 3 creates the identification code and transmits the identification code to the printer 2 upon receiving the failure information or the like, and displays the identification code to inform the user U of the identification code.

However, the present invention is not limited to such an example. For example, it is also possible that, when the maintenance server 3 receives the failure information or the like from the printer 2, the maintenance server 3 automatically transmits the failure information or the like to the operator terminal 4. With such an arrangement, it becomes unnecessary for the user U to inform the operator R of the identification code, and it becomes unnecessary for the operator R to input the identification code in the operator terminal 4.

In the above described embodiment, the extended guidance storage area 42 of the storage unit 32 of the maintenance server 3 stores the extended guidance, and the operator terminal 4 receives necessary extended guidance from the maintenance server 3. However, the present invention is not limited to such an example. For example, it is also possible to preliminarily store the extended guidance in the storage unit 52 of the operator terminal 4. With such an arrangement, it becomes unnecessary for the operator terminal 4 to receive the extended guidance from the maintenance server 3. The same can be said to the basic guidance.

Further, for example, the maintenance server 3 may be provided with a function of the operator terminal 4. To be more specific, the maintenance server 3 may also include an operation unit and a display unit. The maintenance system 1 may be configured by the printer 2, the maintenance server 3 and the internet 5. In this case, when the operator R operates the maintenance server 3, the same processing as described in the embodiment can be performed.

In the above described embodiment, when the printer 2 receives the extended guidance, the printer 2 causes the display operation unit 14 to display the extended guidance. However, the present invention is not limited to such an example. For example, the storage unit 12 may store the received extended guidance. In this case, when the similar failure occurs in future, the display operation unit 14 may display the extended guidance depending on the detection result of the detection unit 16 regarding the failure information, instead of transmitting the failure information or the like to the maintenance server 3. With such an arrangement, the failure can be solved without exchanging information with the maintenance server 3 and the operator terminal 4.

In the above described embodiment, the display operation unit 14 of the printer 2 displays the basic guidance and the extended guidance so that the user can perform an operation to solve the failure while referring to the basic guidance and the extended guidance. However, the present invention is not limited to such an example. For example, when the user U has a user terminal such as a smartphone or a tablet terminal having an image display function and a communication function, the extended guidance or the like may be transmitted to the user terminal so that the user terminal can display the extended guidance or the like.

In the above described embodiment, solution to the failure of the printer 2 of the maintenance system 1 has been described. However, the present invention is applicable to solution to failures of various types of information processing apparatuses such as a copier, a facsimile machine or the like.

Further, the present invention is not limited to the above described embodiment and modifications thereof. For example, the present invention is applicable to a combination the embodiment and some or all of the modifications, and is also applicable to a part extracted from the embodiment and the modifications.

In the above described embodiment, the printer 2 as an information processing apparatus includes the display operation unit 14 as a display unit (or a display device), the detection unit 16 as a detection unit (or a detector), the storage unit 12 as a storage unit (or a storage device), the communication unit 13 as a communication unit, and the controller 11 as a controller. However, the present invention is not limited to such a configuration. The information processing apparatus may include a display unit, a detection unit, a storage unit, a communication unit and a controller respectively having different configurations from the display operation unit 14, the detection unit 16, the storage unit 12, the communication unit 13 and the controller 11.

In the above described embodiment, the maintenance system 1 as a maintenance system includes the printer 2 as an information processing apparatus, the maintenance server 3 and the operator terminal 4 as external devices, and the internet 5 as a communication system. Further, the printer 2 as the information processing apparatus includes the display operation unit 14 as a display unit, the detection unit 16 as a detection unit, the storage unit 12 as a first storage unit, the communication unit 13 as a first communication unit, and the controller 11 as a first controller. Furthermore, the maintenance server 3 and the operator terminal 4 as external devices respectively include the storage units 32 and 52 as second storage units, the communication units 33 and 53 as second communication units, and the controllers 31 and 51 as second controllers. However, the present invention is not limited to such a configuration. The maintenance system may include an information processing apparatus, external devices, and a communication system respectively having different configurations from the printer 2, the maintenance server 3 and the operator terminal 4 and the internet 5. The information processing apparatus may include a display unit, a detection unit, a first storage unit, a first communication unit and a first controller respectively having different configurations from the display operation unit 14, the detection unit 16, the storage unit 12, the communication unit 13 and the controller 11. The external devices may include second storage units, second communication units and second controllers respectively having different configurations from the storage units 32 and 52, the communication units 33 and 53 and the controllers 31 and 51.

The present invention is applicable to an information processing apparatus such as a printer capable of displaying guidance on a display screen or the like to thereby assist a user in performing simple maintenance operation, and a maintenance system for maintenance of the information processing apparatus.

While the preferred embodiments of the present invention have been illustrated in detail, it should be apparent that modifications and improvements may be made to the invention without departing from the spirit and scope of the invention as described in the following claims.

What is claimed is:

1. An information processing apparatus communicably connected with a server, the information processing apparatus comprising:
   a display unit;
   a storage unit that preliminarily stores first guidance information in association with a first error, the first guidance information representing operation contents relating to the first error; and
   a controller that controls the display unit and the storage unit,
   wherein when the first error occurs, the controller causes the display unit to display the first guidance information,
   wherein when a second error different from the first error occurs, the controller receives second guidance information from the server, and causes the display unit to display both of information obtained from the first guidance information and the second guidance information received from the server, and
   wherein when the second error occurs, the controller receives instruction from the server to combine the first guidance information and the second guidance information received from the server.

2. The information processing apparatus according to claim 1, wherein the first guidance information represents operation contents using a first guide image relating to the first error, and
   wherein the second guidance information represents operation contents using a combination of a second guide image and at least a part of the first guide image.

3. The information processing apparatus according to claim 2, wherein the second guide image is created by correcting a part of the first guide image in the server.

4. A maintenance system comprising an information processing apparatus and a server managing information on maintenance of the information processing apparatus, the information processing apparatus comprising:
   a display unit;
   a first storage unit that preliminarily stores first guidance information in association with a first error, the first guidance information representing operation contents relating to the first error; and a first controller that controls the display unit and the first storage unit;

the server comprising:

a second storage unit that stores second guidance information in association with a second error; and a second controller that controls the second storage unit, wherein when the first error occurs, the first controller causes the display unit to display the first guidance information, wherein when the second error different from the first error occurs, the first controller receives the second guidance information from the server, and causes the display unit to display both of information obtained from the first guidance information and the second guidance information received from the server, and wherein when the second error occurs, the first controller receives instruction from the server to combine the first guidance information and the second guidance information received from the server.

5. The maintenance system according to claim 4 further comprising:

an operator terminal that exchanges information with the server, the operator terminal being operated by an operator, wherein the information stored in the second storage unit is second guidance information in association with the second error, wherein the operator terminal creates unregistered guidance information according to an operation of the operator, and transmits the unregistered guidance information to the information processing apparatus directly or via the server, the unregistered guidance information representing operation contents relating to an unregistered state which is different from the first error and corresponds to no second guidance information stored in the second storage unit, and wherein when the information processing apparatus receives the unregistered guidance information, the first controller causes the display unit to display the unregistered guidance information.

6. The maintenance system according to claim 5, wherein when the unregistered state is solved after the display unit displays the unregistered guidance information, the first communication unit of the information processing apparatus transmits result information indicating that the unregistered state is solved to the server, and wherein when the server receives the result information, the server causes the second storage unit to store the unregistered guidance information as new second guidance information in association with the unregistered state.

7. The maintenance system according to claim 5, wherein the first guidance information represents operation contents using a first guide image relating to the first error, and wherein the second guidance information represents operation contents using a combination of a second guide image and at least a part of the first guide image.

8. The maintenance system according to claim 7, wherein the information processing apparatus creates an unregistered guide image included in the unregistered guidance information by correcting a part of the first guide image according to an operation of the operator.

9. The maintenance system according to claim 8, wherein the first guide image includes a character, a graphic or a combination thereof, and wherein the correcting operation is to mask a part of the first guide image.

10. The maintenance system according to claim 8, wherein the first guide image includes a character, a graphic or a combination thereof, and wherein the correcting operation is to add a character, a graphic or a combination thereof to the first guide image.

11. The maintenance system according to claim 4, wherein when the first controller of the information processing apparatus causes the display unit to display the second guidance information, the first controller transmits progress information to the operator terminal directly or via the server, the progress information indicating a state of displaying the information based on the second guidance information, and wherein the operator terminal notifies the operator of the state of displaying the information based on the second guidance information in the information processing apparatus according to the received progress information.

12. A method for displaying error guidance for an information processing apparatus communicably connected to a server, the method comprising:

displaying first guidance information relating to a first error on a display unit, the first guidance information being preliminarily stored, the first guidance information indicating operation contents regarding the first error;

receiving second guidance information relating to a second error different from the first error from the server, when the second error occurs;

receiving instruction from the server to combine the second guidance information obtained from the server and a part of the first guidance information;

combining the second guidance information and the part of the first guidance information based on the instruction; and displaying the combined information on the display unit.

* * * * *